United States Patent
Castegnier

[11] 3,730,608
[45] May 1, 1973

[54] ELECTROLYTIC LIGHT MODULATION SYSTEMS

[76] Inventor: Adrien Castegnier, 10,050 Place Guillauone, Chambon, Quebec, Canada

[22] Filed: Sept. 30, 1971

[21] Appl. No.: 185,176

[52] U.S. Cl.............350/160 R, 178/7.3 D, 356/285
[51] Int. Cl.................................................G02f 1/34
[58] Field of Search..................350/160 R, 161, 267, 350/285; 178/7.3 D

[56] References Cited

UNITED STATES PATENTS

| | | | |
|---|---|---|---|
| 3,612,653 | 10/1971 | Rajchman | 350/160 R |
| 3,443,098 | 5/1969 | Lewis | 350/160 R |
| 3,499,112 | 3/1970 | Heilmeier | 350/160 R |
| 3,238,296 | 3/1966 | Nelson et al. | 350/160 R |
| 2,880,268 | 3/1959 | Ballard | 350/161 R |
| 3,564,261 | 2/1971 | Hadermann et al. | 350/267 |

*Primary Examiner*—Ronald L. Wibert
*Assistant Examiner*—V. P. McGraw
*Attorney*—Pierre Lesperance

[57] ABSTRACT

Systems to modulate beams of light, including monochromatic and laser beams, by the use of an electrolyte chemically constituted to generate a gas medium against an electrode, thereby forming mediums having a different index of refraction than the electrolyte and thence producing reflecting interfaces between either the electrolyte and the gas mediums, or preferably between one prism and one or more associated gas mediums. A system wherein a screen is formed of prisms, an appropriate electrolyte and electrodes which are selectively and sequentially electrically energized and swept to reproduce an image on the screen.

14 Claims, 7 Drawing Figures

PATENTED MAY 1 1973 3,730,608

ELECTROLYTIC LIGHT MODULATION SYSTEMS

This invention relates to the modulation of light and, more particularly, to systems for the modulation of light by the use of an electrolyte and electrically energized electrodes in contact therewith.

There are known devices or systems to modulate the transmission of light, such as, for example, the Kerr cell. The latter is not found satisfactory, since it absorbs a high percentage of the incident light thereon.

It is a general object of the invention to provide a system or device to modulate the light impinging thereon and having a low percentage of absorption of the incident light.

It is another general object of the invention to provide systems for the modulation of light, wherein the incident light is modulated by causing selective total reflection of the latter.

It is a more specific object of the invention to provide systems for the modulation of incident light, using an electrolyte and electrodes in contact therewith, wherein, upon selective electrical energization of the electrodes, the electrolyte produces gas mediums which cause total reflection of corresponding beams of the incident light.

It is another object of the invention to take advantage of the gas mediums which are produced against electrodes immersed into an electrolyte to selectively reflect incident light onto the interfaces produced by the gas medium and an adjacent prism or electrolyte having a different index of refraction.

The invention will now be described in detail with reference to the preferred embodiment thereof, which are schematically illustrated, by way of example only, in the accompanying drawings, in which.

Figure 1:
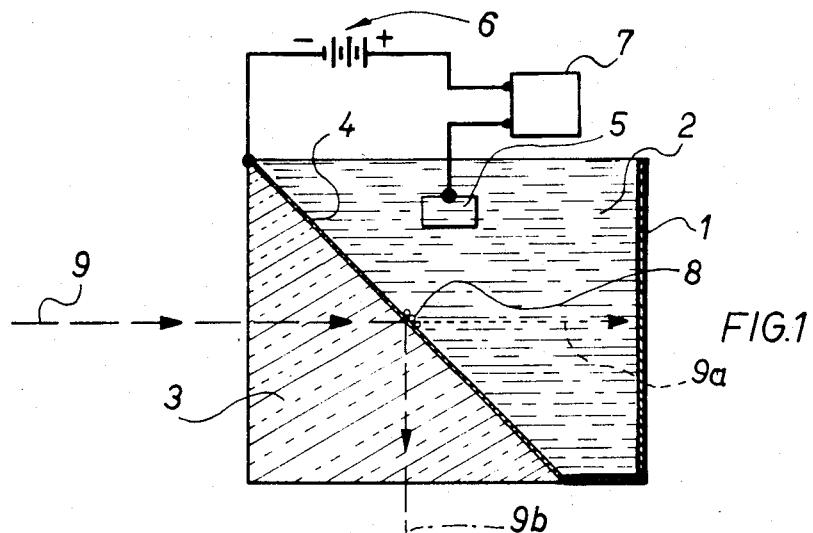
FIG. 1 is a cross-sectional view of a first embodiment of the invention.
Figure 2:
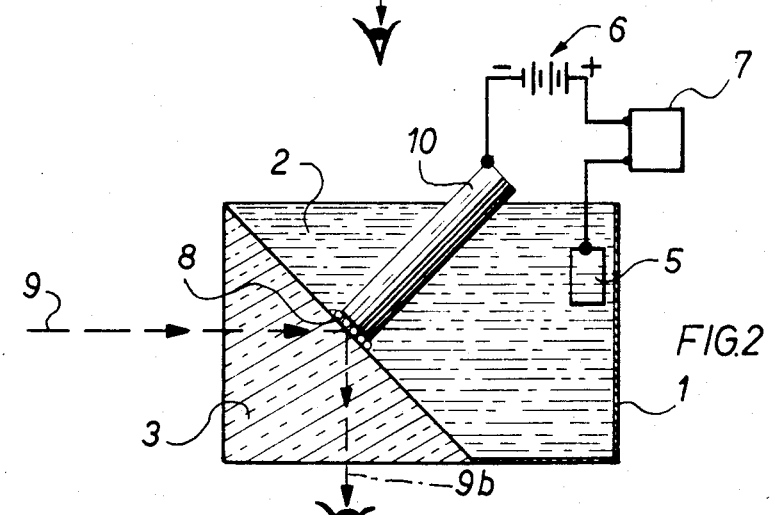
FIG. 2 is a similar cross-sectional view of a second embodiment of the invention.
Figure 4:
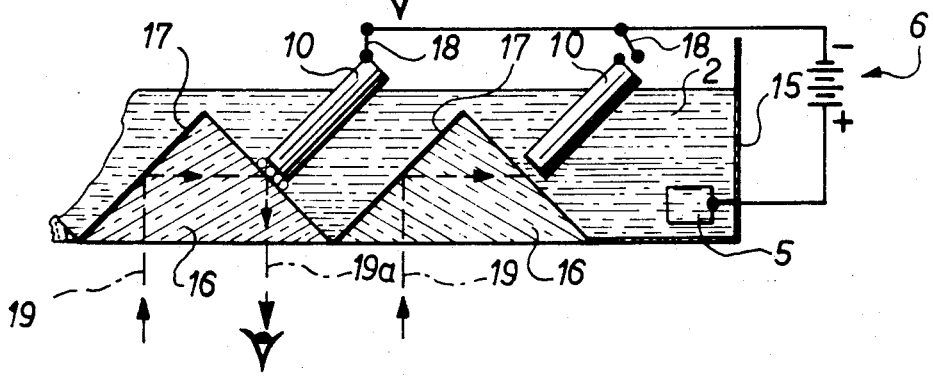
Figure 3:
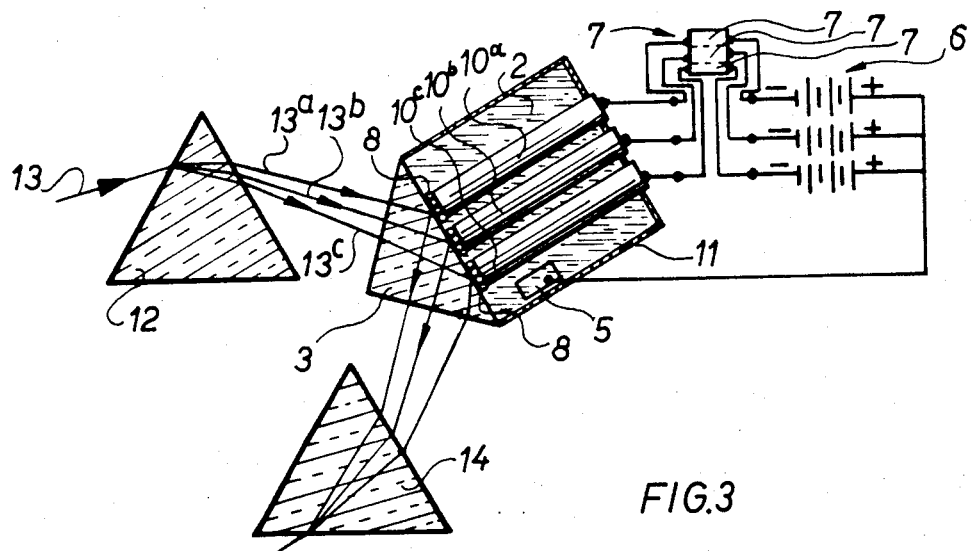
Figure 5:
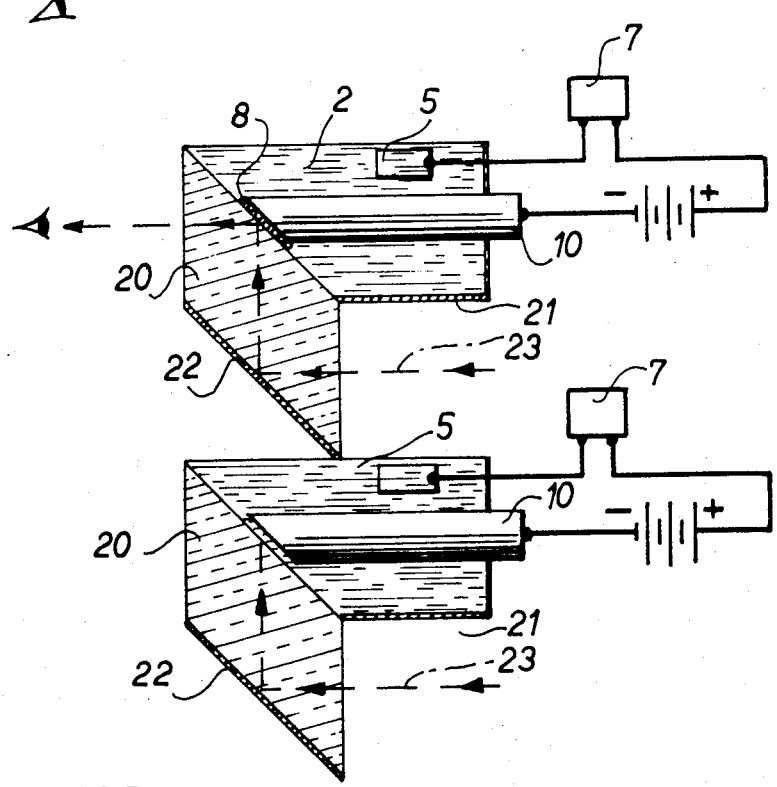
Figure 6:
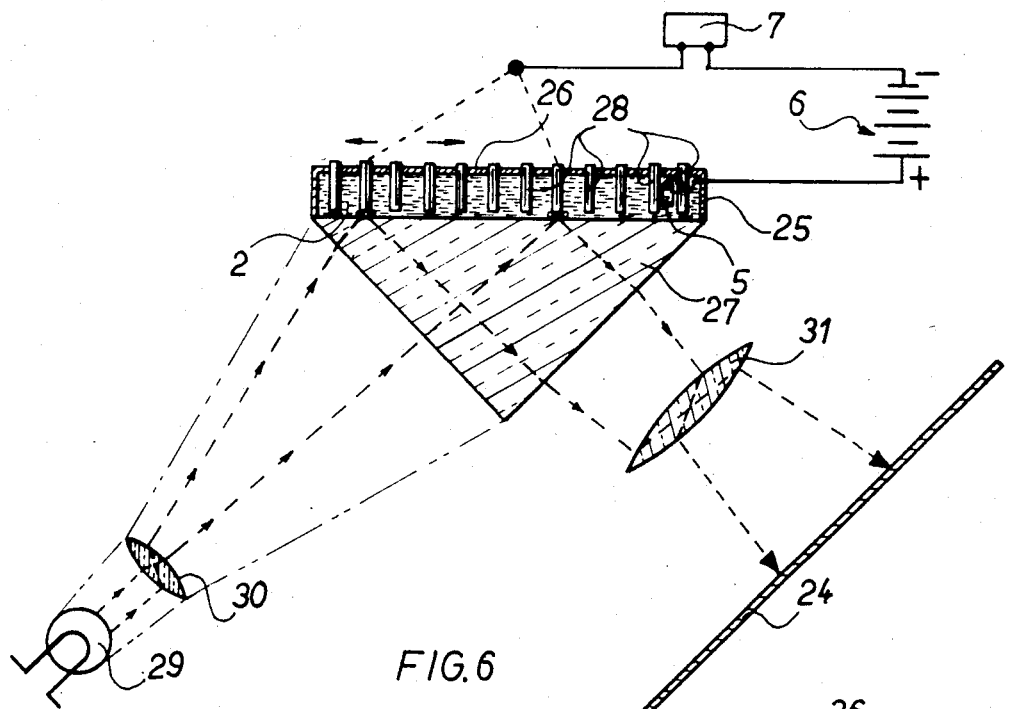
Figure 7:
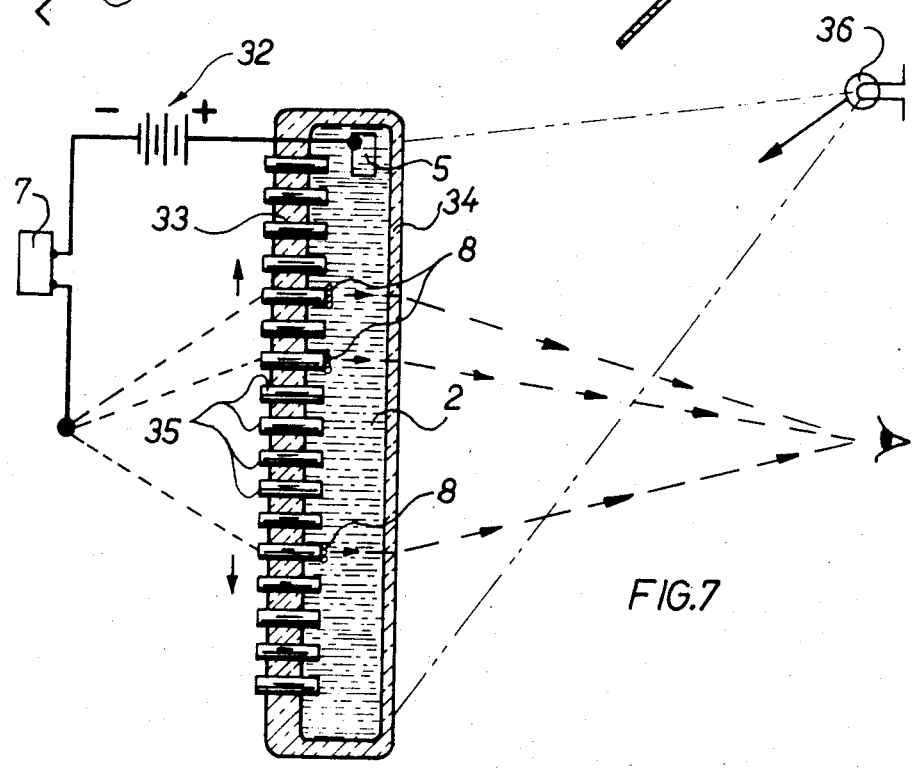

FIG. 3, illustrated on the second sheet of drawings, is a cross-sectional view of a third embodiment of the invention forming a color modulation system;

FIG. 4, illustrated on the same sheet of drawings as FIGS. 1 and 2, is a cross-sectional view of a fourth embodiment or system arranged to form an image reproducing screen;

FIG. 5 is a cross-sectional view of a fifth embodiment of the invention arranged to form another image reproducing screen;

FIG. 6 is a cross-sectional view of a sixth embodiment of the invention, illustrating an application to a system of optical projection; and FIG. 7 is a cross-sectional view of a seventh embodiment of the invention illustrating an application to a display system.

The first embodiment of the invention, illustrated in FIG. 1, includes a container 1, of any suitable type and shape, to contain an electrolyte 2. The latter for any embodiment or application of the invention must be of a suitable type or chemical composition to produce gas bubbles upon electrical energization. A total reflection, right-angle prism 3 forms part of the container 1 and is arranged with its hypotenuse face in contact with the electrolyte 2. The hypotenuse face of the prism 3 is coated with a thin film of metal 4, which must be arranged both to form one electrode and to allow transmission of incident light therethrough. Another electrode 5 dips into the electrolyte 2 and is connected to the electrode 4 by an electrical circuit schematically represented by a battery 6 and an electrical energy modulator 7 connected in series with the electrodes 4 and 5.

It will be readily understood that various types of electrical circuits can be provided to modulately and electrically energize the electrodes, to suit any particular application or embodiment of the invention, as will be better understood later as the description of the various embodiments proceeds.

In FIG. 1, the modulator 7 may be anything from a simple manual switch to a remote-controlled or automatic interruptor which causes a selected electrical energization or de-energization of the electrodes. Upon energization of the latter, the electrolyte produces gas bubbles 8, hereinafter called a gas medium 8, against the surface portion of each electrode 4 and 5 which is in contact with the electrolyte 2. There results an interface between the prism 3 and the gas medium 8, allowing total reflection of a beam of light 9 which is interiorly incident on the hypotenuse face of the total reflection prism 3, this total reflection being due to the distinct indices of refraction of the mediums defining the interface, as is well known by persons skilled in optics. The light which enters one right-angle face of the prism 3, such as the beam of light 9, is then projected and totally reflected outwardly from the other right-angle face of the same prism, upon electrical energization of the electrodes.

The electrolyte 2 must be of substantially the same index of refraction than the associated prism or prisms to cancel the total reflection and to cause the passage of a beam of light into the electrolyte at the hypotenuse face of the prism when the corresponding electrode is not energized. Upon de-energization of the electrodes, the gas medium 8 is dispersed by gravity or otherwise, such as by forced circulation of the electrolyte. The beam of light 9 is then projected into the electrolyte, as shown by 9a, without substantial reflection at 9b.

In the second embodiment, shown in FIG. 2, the arrangement is substantially the same as in FIG. 1, but the thin film electrode 4 is replaced by an electrode rod 10 having one end surface positioned adjacent and close to the hypotenuse face of the prism 3. In such case, the gas medium 8 is formed intermediate and in contact with both the end face of the electrode 10 and the hypotenuse face of the prism 3. The operation remains the same as for the first embodiment, except that, when there is no energization and the gas medium has dispersed, the beam of light 9 passes outwardly of the prism 3 through the hypotenuse face thereof, as seen above, and impinges on the end surface of the electrode 10 and is dispersed or scattered by the latter.

The system of electrolytic modulation shown in FIG. 3, called the third embodiment, applies the principle of the invention to produce a differential modulation of a multicolored beam of light, such as white light, to form selected combinations of three colors, such as the three basic colors used in color television. Of course, the same principle may be used to selectively combine any group of colors of the light spectrum.

The third embodiment includes a container 11 for the electrolyte 2 and a right-angle, total reflection prism 3 forming a wall portion of the container 11 and having its hypotenuse face in contact with the latter. Three electrodes 10a, 10, and 10c, of the same polarity, are arranged into the container 11 with one end surface of each closely positioned adjacent the hypotenuse face of the prism 3. Another electrode 5, of the opposite polarity, is immersed into the electrolyte 2, in any suitable manner. A modulator 7, of any suitable construction having three separate channels 7a, 7b, and 7c, is connected in series with a battery 6 between the electrodes of one polarity 10a, 10b, and 10c and the electrode 5 of the opposite polarity. Each channel 7a, 7b or 7c is connected to a corresponding electrode 10a, 10b or 10c to selectively produce a corresponding gas medium 8, as explained hereinbefore. A first dispersion prism 12 is cooperatively positioned with respect to the total reflection prism 3 to cause a beam of multicolored or white light 13 incident thereon, to be dispersed into a light spectrum entering one right-angle face of the prism 3. The electrodes 10a, 10b, and 10c are positioned such that the gas mediums 8 produced thereby each intersects a main color component 13a, 13b, or 13c of the light spectrum. A reversing second dispersion prism 14 is operatively positioned adjacent the other right-angle face of the prism 3 and arranged to combine or superpose the color components which, at any instant, are selectively totally reflected by selective electrical energization of the corresponding electrodes 10a, 10b, and 10c. This is done by selective operation of the separate modulator channels 7a, 7b, and 7c to electrically energize one or more electrodes 10a, 10b, and 10c and to de-energize the others such that gas mediums 8 will be produced only where and when desired.

In the fourth and fifth embodiments or applications of the invention shown in FIGS. 4 and 5 respectively, systems are provided each having an image reproducing screen arranged to display a two-dimensional image in a generally similar sweeping manner, as the conventional television screen and picture tube.

In the system of FIG. 4, a container 15 includes one wall having a plurality of total reflection prisms 16 arranged in contiguous rows with the hypotenuse faces thereof in a common plane defining the front face of the screen. One right-angle face of each prism 16 is provided with a reflective coating 17. A plurality of electrodes 10 of one polarity are positioned along each row of prisms 16 with one end surface of each electrode 10 arranged closely adjacent to the other right-angle face of a corresponding prism 16. The container 15 holds an electrolyte 2 and an electrode 5 of the opposite polarity is immersed into the electrolyte. Each electrode 10 is provided with a switch 18, or the like, to be modulatively energized and de-energized thereby in association with an electrical circuit including an electrical power supply, such as a battery 6, and connecting the electrodes 10 of one polarity to the electrode 5 of opposite polarity.

When one switch 18 is closed, as shown on the left side in FIG. 4, the corresponding electrode 10 is electrically energized and a gas medium 8 is produced in contact with the one end surface thereof and with the adjacent face of the corresponding prism 16. In such case, a beam of light 19 entering from the front into the concerned prism 16 is reflected against the reflective coating 17 and totally reflected at the interface of the gas medium 8 and the associated right-angle face, resulting in the forward projection of a corresponding beam of light 19a. The same happens for each electrically energized electrode 10, whereas the non-energized electrodes do not provide a forwardly directed beam of light due to the dispersion of the gas mediums 8, as explained before. A train of images may be reproduced by continuously opening and closing the desired switches 18.

Persistance of the reproduced images may be enhanced by the addition of a relatively viscous liquid into the electrolyte, such as glycerine, to slow the dispersion of the gas mediums 8 from around the electrodes 10.

In the embodiment shown in FIG. 5, a series of parallel rows of prisms 20, of rhombic cross-section, are assembled together to form the screen. One of two parallel faces of each rhombic prism 20 is in contact with an electrolyte 2 retained into a container 21. As for the previous embodiment, a plurality of electrodes 10, of one polarity, are associated to the prisms 20 and each separately produces a gas medium 8 when desired. The other of the above two parallel faces of each prism 20 is provided with a reflective coating 22. Each container 21 has an electrode 5, of opposite polarity, immersed into the electrolyte 2. For each prism 20, an electrical circuit, including a battery 6 and a modulator 7, connects the electrodes 10 of one polarity to the electrode 5 of opposite polarity. Each modulator 7 includes sweeping and modulating components, of any suitable type, to reproduce one image or a train of images on the screen formed by the rows of prisms 20. In this case, the illumination or incident beams of light 23 enter from the rear of the screen, as in a conventional television screen. The beams of light 23 are deflected by the reflective coating 22, totally reflected by the generated interfaces and projected forwardly and outwardly from the screen when the corresponding electrodes 10 are energized.

The sixth embodiment illustrated in FIG. 6, is particularly applicable to the reproduction of images on a projection screen 24. The system of this embodiment includes a container 25 forming a shallow box structure having a pair of parallel walls forming a back wall 26 and a front wall formed by a right-angle prism 27 having its hypotenuse face contacting an electrolyte 2 into the container 25. Electrode bars 28 of one polarity are secured to the back wall 26 and extend into the electrolyte 2 in generally parallel relationship one to another. Each electrode bar 28 has one end surface arranged adjacent to the hypotenuse face of the prism 27 to form a gas medium in contact with the latter. The one end surfaces of the electrode bars 28 form a bi-dimensional array. An electrode 5, of opposite polarity, is immersed into the electrolyte 2. An electrical circuit, including a battery 6 or another electrical energy supply and a modulator 7 having sweeping and modulating components, connects the electrode 5 to the electrodes 28 for selected and sequential energization of the latter. For instance, the modulator may be of any suitable type to select the electrodes 28 which are to be energized. As an example, a recorded tape could be used and connected to perform the sweeping and modulating functions.

A source of light 29 illuminates, through an objective 30, the various interfaces produced by the gas mediums of the energized electrodes 28, and an objective 31 transmits the totally reflected beams of light onto the projection screen 24 to reproduce desired images on the latter.

The seventh embodiment, shown in FIG. 7, defines a system including a container 32 in the form of a shallow box having a back wall 33 and a transparent front wall 34 closed, spaced apart and parallel to each other. An array of electrode bars 35, an electrolyte 2 and an electrode 5 are provided similarly as in the previous embodiment shown in FIG. 6. An electrical circuit including a battery 6 and an electrical energy modulator 7 having sweeping and modulating components, connects the electrode 5 to the electrodes 35 to produce gas mediums 8 against the inside end surfaces of selected electrodes 35.

A source of light 36 is suitably positioned in front of the shallow box to project incident light inwardly through the transparent front wall 34. Such incident light, upon contacting the interfaces produced between the generated gas medium 8 and the electrolyte 2, is totally reflected forwardly through the transparent front wall 34. An image or train of images can thus be produced by electrical energization of appropriate electrodes 35 and sweeping of all the electrodes 35 to place successive rows of the latter in an energizable state, as for the embodiments of FIGS. 4, 5, and 6.

The electrolyte is constituted of a solution of an acid in water, such as the sulfuric acid, to cause generation of gases, hydrogen and oxygen against the electrodes. The electrolyte may be either transparent or opaque.

It must be noted that the electrolyte and the total reflection prisms in contact therewith must have substantially equal inclines of refraction such that, when the electrodes are not energized, the beams of light pass from the total deflection prism into the electrolyte and the total deflection is not obtained.

The gas bubbles or mediums which are produced escape into the air, are recirculated with the electrolyte to leave the electrodes, are absorbed by suitable chemical substances or are submitted to sonic or supersonic vibrations to enhance escape thereof.

The modulation of the electrical energy on the electrodes may be done by varying either the intensity, voltage or frequency of the electrical current fed to the electrodes.

The resolution of the images reproduced by the above-mentioned systems or embodiments is obviously related to the number of electrodes 10, 28, and 35 per unit of surface.

The total reflection prisms 16 and 20 may each be formed of elongated prisms instead of rows of longitudinally juxtaposed prisms.

The reflected beams of light produced by the electrodes 10 of FIGS. 4 and 5 may be filtered to produce color components, such as red, green and blue and the prisms may be arranged to produce superpositions of the colors.

Obviously, the scope of the present invention is not to be restricted to the specific embodiments illustrated but is to be extended to other embodiments which fall within the scope of the appended claims.

I claim:

1. In a system of electrolytic light modulation, the combination comprising a container constructed and arranged to contain an electrolyte therein, a first and a second electrode means each having a surface portion arranged for contacting said electrolyte inside said container, a transparent member having one face in contact with said electrolyte and closely spaced from said one surface portion of said first electrode means, said electrolyte being chemically constituted to generate a gas medium upon electrical energization thereof, against said one face of said transparent member and between the latter and said one surface portion of said first electrode means, and said container being light pervious to allow a beam of light to impinge upon said gas medium through said transparent member and to be totally reflected at the interface of the latter for projection outside said container when said electrical energization is produced.

2. A system of electrolytic light modulation as defined in claim 1, wherein said transparent member constitutes a total reflection prism defining said one face and mounted adjacent said one surface portion of said first electrode means, in contact with said electrolyte and with said gas medium upon generation of the latter, said electrolyte and said prism have substantially equal indices of refraction, and said prism is arranged to cause said beam of light to be incident therethrough onto the interface defined by said face of said prism and said generated gas medium upon production of the latter, whereby to be totally reflected during said electrical energization and to be projected into said electrolyte upon electrical de-energization of said electrode means.

3. A system of electrolytic light modulation as defined in claim 2, wherein said prism forms a light transmitting wall portion of said container and said beam of light passes through said prism from outside said container and towards said one surface portion of said first electrode means.

4. A system of electrolytic light modulation as defined in claim 3, further including an electric circuit and an electrical energy modulator connected to said electrode means and arranged to modulatively energize the latter.

5. A system of electrolytic light modulation as defined in claim 2, wherein said first electrode means includes a plurality of electrodes each having one surface arranged in close spaced relationship relative to said one face of said prism, and in contact with said electrolyte for the production of individual gas mediums against each of said one surfaces respectively and said one face of said prism upon said electrical energization, said prism is arranged to transmit therethrough an individual beam of light for each of said one surfaces, to the interfaces defined by said one face and each of the generated gas mediums upon production of the latter, and said prism and said one surfaces are constructed and arranged to cause total reflection of selected ones of said beams of light upon selective electrical energizations of the corresponding ones of said electrodes to transmit modulated visual information and to project the latter outwardly of said prism.

6. A system of electrolytic light modulation as defined in claim 5, wherein each of said beams of light conveys a different color component of the light spectrum, one of said electrodes is provided for each of said color components of the light spectrum, an electrical circuit is connected to said electrodes and to said second electrode means and an electrical energy modulator is provided into said electrical circuit for each of said ones of said electrodes to selectively and individually energize said electrodes and totally reflect said color components of the light spectrum to transmit selected colored information.

7. A system of electrolytic light modulation as defined in claim 6, wherein a first dispersion prism is operatively associated to said one total reflection prism to disperse a beam of multi-colored light into a light spectrum and to project the latter through said one prism to form said beams of light of different color components into said total reflection prism, and a second dispersion prism is operatively associated to said one total reflection prism to combine the individually and simultaneously reflected beams of different color components.

8. A system of electrolytic light modulation as defined in claim 5, wherein said plurality of electrodes are assembled into an array having said surfaces arranged into a bi-dimensionally spaced-apart relationship, and an electrical circuit including sweeping and modulating components is connected to said second electrode means and to said plurality of electrodes to perform sweeping and modulated energization of the latter and to produce a selected train of images.

9. A system of electrolytic light modulation as defined in claim 8, wherein said container forms a relatively shallow box structure having a back wall and a front wall formed by said prism, the latter is a right-angle prism having the hypotenuse face thereof forming said one face and arranged parallel to said back wall, said electrodes are electrically conductive rods supported in spaced and generally parallel relationship by said back wall with said one surfaces thereof extending into said box structure, a light source is mounted exteriorly of said right-angle prism and arranged to illuminate one of the right-angle face thereof, and an optical objective is mounted adjacent the other right-angle face of said prism and arranged to project said images onto a projection screen.

10. A system of electrolytic light modulation as defined in claim 1, further including a plurality of prisms arranged into rows extending lengthwise of each other, said first electrode means includes a plurality of electrodes each having one surface arranged in close spaced relationship relative to one face of said prisms and in contact with said electrolyte for the production of individual gas mediums against each of said one surfaces and said one face of said prisms upon said electrical energization, said prisms are arranged to angularly transmit therethrough an individual beam of light for each of said one surfaces, to the interfaces defined by each of said one face of said prisms and each of the generated gas mediums upon production of the latter, and said prisms and said one surfaces are constructed and arranged to cause total reflection of selected ones of said beams of light upon selective electrical energization of the corresponding ones of said electrodes to transmit modulated visual information and to project the latter outwardly of said prisms.

11. A system of electrolytic light modulation as defined in claim 10, wherein said prisms are of right-angle cross-section and form narrow and contiguous strip portions of one wall of said container and one right-angle face of each of said prisms is made reflective to reflect incident light into said prisms towards the associated one surfaces.

12. A system of electrolytic light modulation as defined in claim 11, wherein the hypotenuse faces of said prisms are facing in generally the same direction outwardly on one side of said container and said prisms are constructed and arranged to receive incident light inwardly from said one side and to project said modulated visual information outwardly from said same one side of the container.

13. A system of electrolytic light modulation as defined in claim 10, wherein each of said prisms constitutes a rhombic prism having one of two parallel faces made reflective and the other of said two parallel faces arranged to be in contact with said electrolyte and said rhombic prisms are constructed and arranged to receive incident illumination inwardly from one side thereof and to project said modulated visual information outwardly from the opposite side thereof.

14. A system of electrolytic light modulation as defined in claim 13, wherein said rows of prisms, said container, said electrodes, and said electrolyte are assembled into a relatively shallow structure forming a screen for the reproduction of an image thereon upon suitable sweeping of said electrodes and means is provided to enhance the persistance of images on said screen.

* * * * *

UNITED STATES PATENT OFFICE
CERTIFICATE OF CORRECTION

Patent No. 3,730,608  Dated May 1, 1973

Inventor(s) ADRIEN CASTEGNIER

It is certified that error appears in the above-identified patent and that said Letters Patent are hereby corrected as shown below:

On the cover sheet [76], "10,050 Place Guillauone, Chambon, Quebec, Canada" should read -- 325 Melbourne Avenue Town of Mount Royal, Quebec, Canada --.

Signed and sealed this 20th day of November 1973.

(SEAL)
Attest:

EDWARD M. FLETCHER, JR.
Attesting Officer

RENE D. TEGTMEYER
Acting Commissioner of Patents